United States Patent [19]

Gamble

[11] Patent Number: 4,728,830

[45] Date of Patent: Mar. 1, 1988

[54] ELECTRIC MOTOR WITH MAGNETIC ENHANCEMENT

[75] Inventor: John G. Gamble, Hingham, Mass.

[73] Assignee: Sigma Instruments, Inc., Braintree, Mass.

[21] Appl. No.: 870,624

[22] Filed: Jun. 4, 1986

[51] Int. Cl.$^4$ ............................................. H02K 41/00
[52] U.S. Cl. ................................... 310/12; 310/49 B; 310/181; 310/154
[58] Field of Search ................. 310/154, 184, 179, 12, 310/49

[56] References Cited

U.S. PATENT DOCUMENTS 3,553,508 1/1971 Stecherbatcheff .............. 310/181 X
4,563,602 1/1986 Nagasaka .......................... 310/49 X

*Primary Examiner*—Donovan F. Duggan
*Attorney, Agent, or Firm*—Leo Stanger

[57] ABSTRACT

Iron surfaces of stator poles, rotor periphery, or both stator poles and rotor periphery, of stepping motors are manufactured without teeth. The stepping effects of teeth are obtained by bonding, to the toothless surfaces, webs composed of fluted magnetic material having alternate thin and thick sections magnetized in the direction of the thickness of the material and carrying soft magnetic inserts in the flutes. The inserts form virtual teeth. The thick sections are magnetized in the direction opposite to the thin section and the flutes extend in the direction transverse to the direction of relative motion between rotor and stator.

12 Claims, 8 Drawing Figures

ELECTRIC MOTOR WITH MAGNETIC ENHANCEMENT

RELATED APPLICATIONS

This application is related to the U.S. application of Ralph W. Horber, Ser. No. 612,563, filed May 21, 1984, U.S. application of Ralph W. Horber and John G. Gamble, Ser. No. 735,935, and U.S. application of Robert Mastromattei being filed concurrently with this application and owned by the same entity as this application and entitled "Magnetically Enhanced Variable Reluctance Motor Systems". These applications are hereby made a part of this application as if fully recited herein.

BACKGROUND OF THE INVENTION

This invention relates to electric motors, and particularly electric motors whose electrically energized salient stator poles terminate in stator teeth that oppose rotor teeth on the rotor periphery, and in which permanent magnets located between adjacent stator teeth and/or rotor teeth and magnetized transverse to the stator-rotor gap enhance the motor torque relative to the applied ampere-turns.

Such electric motors are disclosed in the aforementioned U.S. applications. The enhancement described in these applications afford hybrid motors and variable reluctance motors substantial increases, such as 50%, in torque constant. Permanent magnets of materials such as samarium cobalt are located between the stator teeth of hybrid stepping motors, between the stator teeth and rotor teeth of some variable reluctance motors, and between only the stator teeth of other variable reluctance motors. These magnets increase the torque available from a given ampere-turns excitation by controlling the motor's air gap and altering the permeance slope, i.e. the torque making mechanism. The inter-teeth magnets also increase the rate of change of flux through the teeth when the motor rotates, thereby improving the motor's performance as a generator.

In the past, production of such motors has required placement of permanent magnet inserts in the slots between stator teeth and between rotor teeth. Such inserts are difficult to manufacture and the task of placing them and securing them in position has been laborious.

SUMMARY OF THE INVENTION

An object of the invention is to overcome the aforementioned disadvantages.

Another object of the invention is to improve such enhance motors.

According to a feature of the invention, these objects are achieved in whole or in part by manufacturing the stator poles, rotor periphery, or the stator poles and rotor periphery, as continuous surfaces without teeth and bonding to the toothless surfaces webs composed of a fluted magnetic material having alternate thin and thick sections magnetized in the direction of the thickness of the material and carrying soft magnetic inserts in the flutes so that the inserts form the teeth and the thick sections constitute the equivalent of the permanent magnet inserts.

According to a feature of the invention, the thin sections of the permanent magnetic material are smaller than the thick sections by a factor of one to four or more.

According to another feature of the invention, the thin thin sections of the permanent magnetic material are magnetized in the direction opposite to the magnetization direction of the thick sections of the permanent magnetic material.

According to another feature of the invention, the inserts that form the teeth between the thick sections that constitute the permanent magnets are in the form of slot rods of high permeability, substantial electrical resistance, ferromagnetic material, such as $3\frac{1}{2}\%$ silicon iron.

These and other features of the invention are pointed out in the claims. Other objects and advantages of the invention will become evident from the following detailed description when read in light of the accompanying drawings.

DETAILED DESCRIPTION OF PREFERRED EMBODIMENTS

Figure 1:
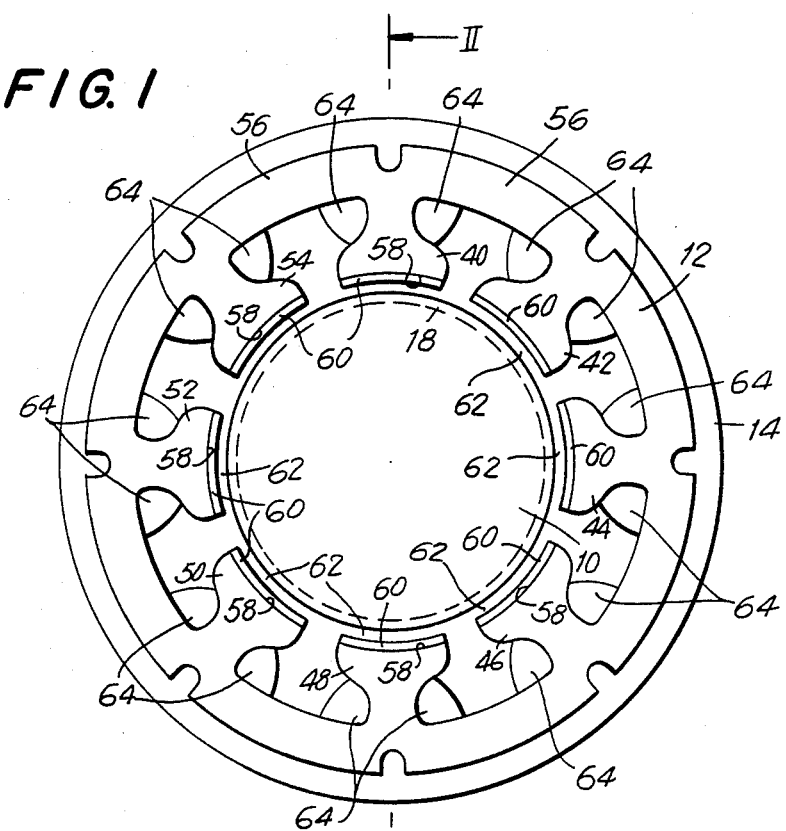
FIG. 1 is a schematic sectional view of a motor embodying features of the invention, and taken along the crosssectional line I—I of FIG. 2.
Figure 2:
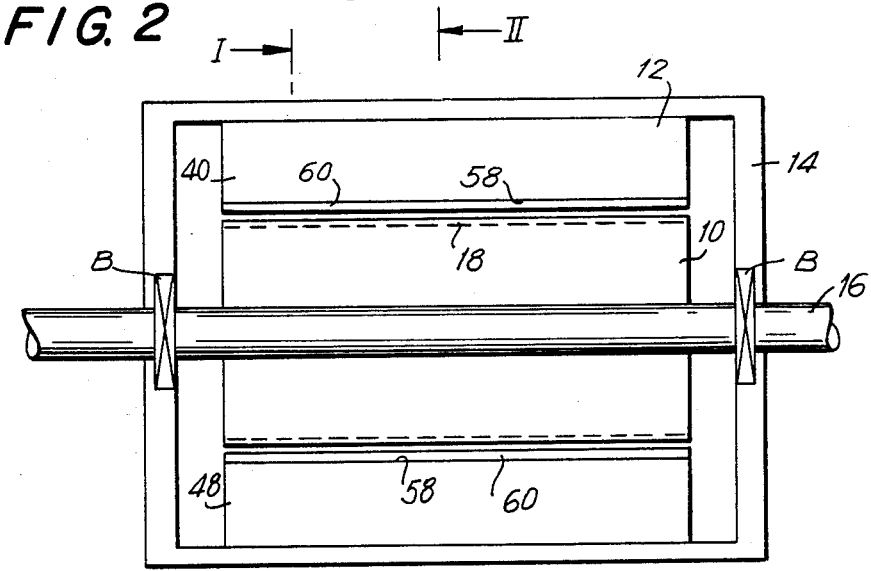
FIG. 2 is a crosssection II—II of FIG. 1.

In FIGS. 1 and 2, a rotor 10 of a motor embodying the invention rotates within a stator 12 mounted within a housing schematically shown as 14. A shaft 16 projects through the housing 14 and is keyed to the rotor 10 for rotation therewith. Suitable bearings B mount the rotor 10 and the shaft 16 so they can rotate within the housing 14. The rotor 10 in FIGS. 1 and 2 is illustrated only generally as a cylinder with a surface structure 18. Details of the rotor are shown in FIGS. 3 to 8.

The motor of FIGS. 1 and 2 may have several forms depending on the character of the rotor 10. The motor may be a magnetically enhanced hybrid motor which uses magnetic enhancement only in the stator as shown in the aforementioned Horber and Horber et al applications. In that case the rotor 10 of FIGS. 1 and 2 is in the form shown in FIG. 3. The motor of FIGS. 1 and 2 may be a stator enhanced variable reluctance motor in which only the stator is enhanced as disclosed in the aforementioned Mastromattei application. In that case the motor of FIGS. 1 and 2 uses the rotor of FIG. 4. The motor of FIGS. 1 and 2 may also be a stator-rotor enhanced variable reluctance motor with rotor enhancement as disclosed in the aforementioned Horber and Horber et al applications. In that case the motor incorporates the rotor of FIG. 5. The motor of FIGS. 1 and 2 may also have only the rotor magnetically enhanced.

Figure 3:
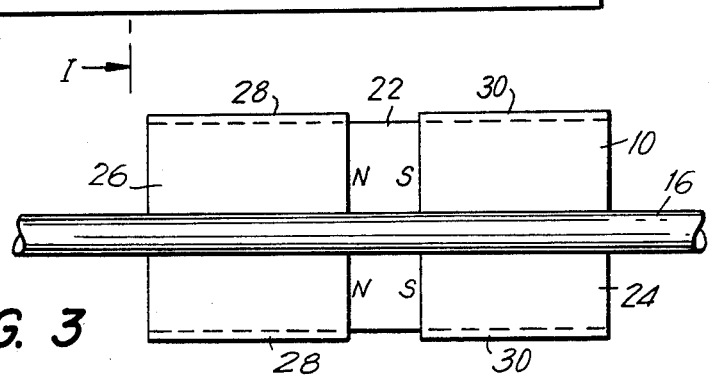
FIG. 3 is a crosssection of a rotor used in the device of FIG. 1 and FIG. 2 when the motor is a hybrid motor.

In FIG. 3, a permanent magnet 22 divides the rotor 10 into two cylinders 24 and 26 which it magnetizes. Each cylinder 24 and 26 terminates in one of two sets of peripherally-spaced axially-extending radially-projecting stator teeth 28 and 30. The teeth 28 of one cylinder 26 are displaced angularly one half tooth pitch from the teeth 30 of the other cylinder 24. The teeth 28 and 30 constitute one form of the surface structure 18 in FIGS. 1 and 2.

Figure 4:
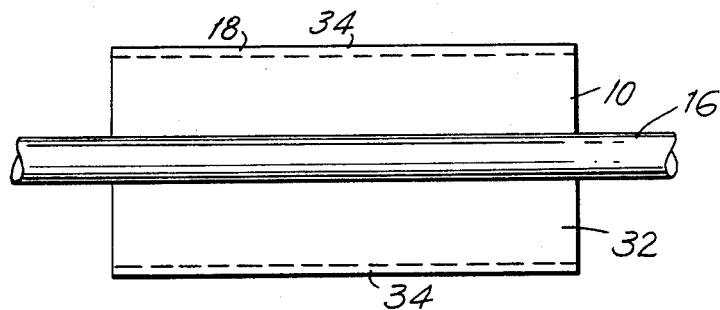
FIGS. 4 and 5 are cross-sectional views of two other rotors used in the structures of FIGS. 1 and 2 when the motor is a variable reluctance motor.

In FIG. 4, the rotor 10 is composed of a single cylinder 32 secured to the shaft 16. The surface of the cylinder 32 integrally carries peripherally-spaced radially projecting teeth 34 that extend axially from end to end to form the structure 18. In FIGS. 3 and 4, the cylinders 24, 26, and 32 are each composed of annular laminations which terminate in the radially outward peripherally-spaced rotor teeth. The rotor teeth are part of the surface structure 18 in FIGS. 1 to 4. The number of rotor teeth 28 and 30 may for example be fifty with the angular or peripheral tooth pitch, that is the angular spacing between like points on adjacent rotor teeth, being 7.2 degrees.

Figure 5:
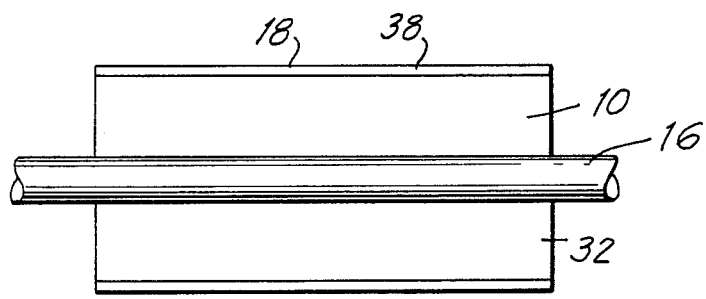

When the device of FIGS. 1 and 2 is in the form of a variable reluctance motor with both stator and rotor enhancement, it incorporates the rotor of FIG. 5. Here, annular rotor laminations form a single cylinder 32 with a smooth surface 36 to which is bonded an enhanced tooth structure 38 which forms the surface structure 18 of FIGS. 1 and 2 and extends longitudinally from end to end on the rotor. Details of the structure 38 appear in FIG. 8.

Eight angularly displaced stator poles 40, 42, 44, 46, 48, 50, 52, and 54 project radially inward from a common circumscribing stator portion 56 to form the stator 12. The poles 40 to 54 extend longitudinally along the entire axial dimension of the stator 12. The stator poles 40 to 54 each terminate radially inward in a smooth cylindrical surface 58 to which a tooth structure 60, which is illustrated only schematically in FIGS. 1 and 2, is bonded. Details of the tooth structures appear in FIG. 6. The tooth structures 64 extend radially inward along an imaginary cylindrical surface coaxial with the rotor 10 and spaced slightly from the rotor teeth across an air gap 62. In one embodiment each stator pole tooth structure 60 carries four pole teeth spaced to exhibit the same pitch as the rotor teeth in FIG. 3. The poles 40 to 54 and their respective teeth may assume angular positions such that the teeth on two opposite poles such as 40 and 48 are shifted one quarter tooth pitch from teeth on adjacent poles 42 and 50 as well as 54 and 46. In this way when the poles are sequentially magnetized they can move the rotor.

Stator coils or windings 64, when energized by a suitable driver, magnetize the poles 40 to 54 in a sequence that causes rotation of the rotor 10. Many excitation sequences are known for the coils 64 and additional ones are disclosed in the aforementioned copending applications.

Figure 6:
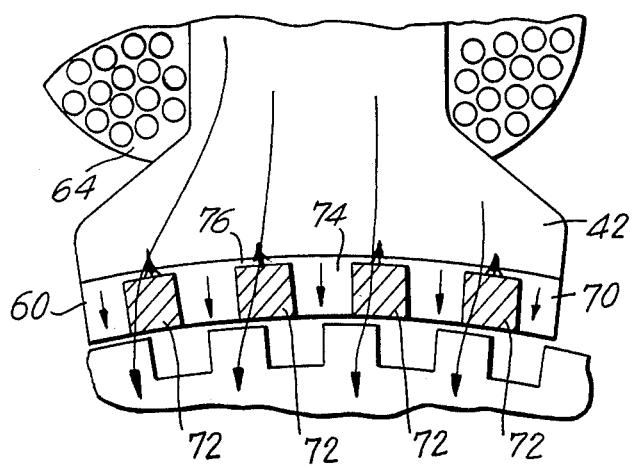
FIG. 6 shows portions of a stator pole and the rotor of FIG. 1.

FIG. 6 illustrates details of the motor in FIG. 1 using the rotor of FIG. 3 and shows the parts of the structure 18 on the stator pole 40 as an example of the structure 18 on other poles. Here, a cylindrical molded, extruded, isostatically pressed, or otherwise fabricated permanent magnet array or rigid web 70 containing high magnetic coercivity material such as samarium cobalt, neodymium boron iron alloys, ferrites, Alnico, etc. is bonded to the surface 58 of the stator pole 42. The array is fluted to receive rods 72 of high permeability substantial electrical resistance ferromagnetic material such as 3½% Silicon Iron. Substantial electrical resistance refers to resistance sufficient to suppress eddy currents. The rods 72 constitute the teeth (virtual teeth) on the surface of the pole 40. The array 70 includes thick portions 74 and thin portions 76 all magnetized radially with respect to the axis of the motor. The thick portions are poled in one radial direction while the thin portions are poled in the reverse radial direction so that they couple in space. The permanent magnet array 70 maintains spatial registration of the virtual teeth 70. The performance of the motor during energization of the windings 64 is equivalent to the enhanced motor disclosed in the aforementioned Horber and Horber et al applications.

Figure 7:
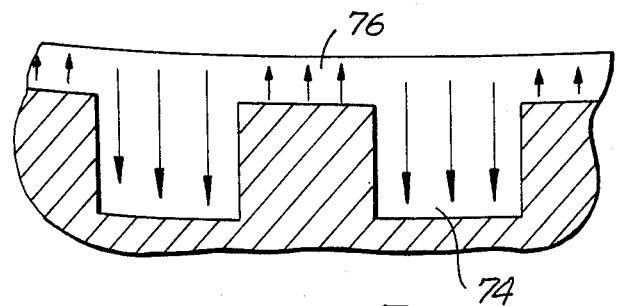
FIG. 7 is a schematic view illustrating the permanent magnetic material used in the structures of FIGS. 1 to 3 as well as FIGS. 5 and 6, and showing the permanently magnetized fluxes within the permanent magnetic material.

FIG. 7 is an enlarged view of the array 70 of FIG. 6 to indicate the magnetization of the various portions 76 and 74. The thin portions 76, i.e. the short thickness magnetic poles, do not have sufficient length in proportion to cross-section to support the required flux, but rather serve to provide a positive "NI" to aid in spanning the gap. The stator pole magnetization induced by the coils 64 is of a polarity to oppose the polarity of the thickness of the thicker portions 74 in the array 70.

In the hybrid motor using the rotor of FIG. 3, the polarities of the portions 72 and 74 on the axial rear half of the stator pole are opposite to that on the forward half. When the motor of FIGS. 1 and 2 uses the rotor of FIG. 4 to operate as a variable reluctance motor without rotor enhancement, the details at the poles remain the same as in FIGS. 3 and 6 except that the polarities of the array 70 remain the same throughout the axial length of the stator pole. The polarity induced in each stator pole opposes the polarity of the thicker portions 74 in the array 70.

Figure 8:
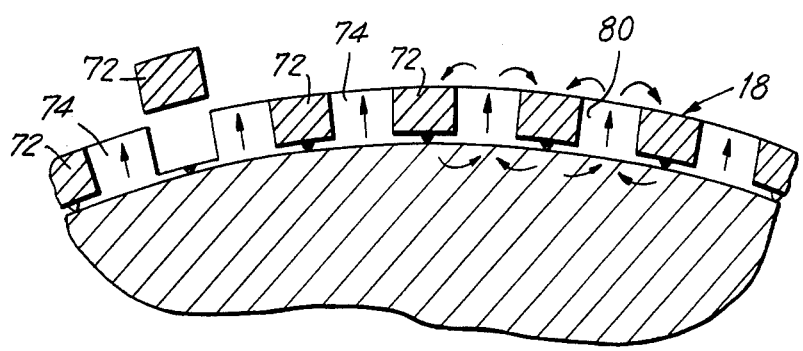
FIG. 8 is a detailed schematic cross-sectional view showing flux fields in the rotor of FIG. 3 and FIG. 4.

FIG. 8 illustrates the structure 18 on the rotor of FIG. 5 which is used in FIGS. 1 and 2 when the motor operates as a variable reluctance motor with both stator and rotor enhancement. Here again, rods of high magnetic permeability lowe-lectricalconductivity alloy iron fit in the flutes of an array 80 corresponding to the array 70. The thicker portions 74 of the array 80 have polarities to oppose the magnetization induced by the windings 64 about the poles 40 to 54.

According to an embodiment of the invention, FIGS. 1 and 2 operate with magnetic enhancement only in the rotor.

In all of these arrangements the iron rods as well as the arrays are bonded to each other and to the pole or rotor surfaces.

In operation, the coils 64 are energized to induce magnetic fields which apply magnetomotive forces between the teeth on the stator 12 and the teeth on the rotor 10 so as to move the rotor. The magnetic materials in the array 70 and the array 80, particularly the thick portions 74, enhance the operation in a manner similar to that of the aforementioned applications.

The invention avoids the the difficulty of shaping the slot magnets by forming a substructure of teeth and magnetic material and bonding the material to a smooth, skived, splined, or keyed surfaces of the stator poles and the rotor. The arrays 70 and 80 are easier to manufacture than magnets that fit into the slots between iron stator or rotor teeth. It is simpler to fit iron slots in the array flutes. For example when the arrays are ferrite extruded along the direction of the flutes, the crystals have long axes which conform to the direction of flow. The easy axis of magnetization is perpendicular to the crystal axes.

The invention may also be practiced with linear motors where the actuator replaces the rotor as the mover in the motor.

While embodiments of the invention have been described in detail, it will be evident to those skilled in the art that the invention may be embodied otherwise without departing from its spirit and scope.

What is claimed is:

1. An electric motor, comprising:
    a stator having a plurality of poles;
    a winding on each of said poles;
    a mover movable relative to said stator poles;
    tooth forming means mounted on said stator pole and facing said mover;
    said tooth forming means including a permanent magnetic structure having a plurality of thin portions bonded to said stator poles and a plurality of thicker portions integral with said thin portions and bonded to said stator poles;
    said thin portions and said thicker portions being elongated and extending longitudinally in a direction transverse to movement of the mover relative to said stator and forming flutings between said thicker portions, said thicker portions projecting toward said mover;
    said thin and thicker portions being magnetized in directions toward and away from the mover, said thin portions and said thick portions being magnetized in opposite directions;
    a plurality of rods each fitted in the flutings and bonded to said tooth forming means, said rods being of a high permeability ferromagnetic material and forming teeth for said stator poles.

2. A motor as in claim 1, wherein said mover has a surface facing the stator poles;
    tooth forming means mounted on said mover surface and facing said poles;
    said tooth forming means on said mover including a permanent magnetic structure having a plurality of thin portions bonded to said mover surface and a plurality of thicker portions integral with said thin portions and bonded to said mover surface;
    said thin portions and said ticker portions on said mover extending longitudinally in a direction transverse to movement of the mover relative to said stator and forming flutings between said thicker portions, said thicker portions on said mover projecting toward said stator poles;
    said thin portions and said thicker portions being magnetized in directions toward and away from the stator poles, said thin portions and said thicker portions being magnetized in opposite directions;
    a plurality of rods each fitted in the flutings and bonded to said tooth forming means, said rods being of a high permeability ferromagnetic material and forming teeth for said stator poles.

3. A motor as in claim 1, wherein said mover is a rotor.

4. A motor as in claim 1, wherein said mover is a rotor having a plurality of angularly spaced radially projecting and axially extending teeth.

5. A motor as in claim 1, wherein said rotor includes a magnet for axially splitting and magnetizing said rotor.

6. A motor as in claim 3, wherein said rotor includes a magnet for axially splitting and magnetizing said rotor.

7. A motor as in claim 3, wherein said rotor is a single cylinder extending along the length of said stator poles.

8. A motor as in claim 2, wherein said mover is a rotor.

9. A motor as in claim 2, wherein said mover is a rotor having a plurality of angularly spaced radially projecting and axially extending teeth.

10. A motor as in claim 2, wherein said rotor includes a magnet for axially splitting and magnetizing said rotor.

11. A motor as in claim 8, wherein said rotor includes a magnet for axially splitting and magnetizing said rotor.

12. A motor as in claim 9, wherein said rotor is a single cylinder extending along the length of said stator poles.

* * * * *